(12) United States Patent
Simpson et al.

(10) Patent No.: US 6,241,188 B1
(45) Date of Patent: Jun. 5, 2001

(54) AIRCRAFT SEATS

(75) Inventors: Leslie James Simpson, Chesham Bois; Geoffrey Harcourt, Benson, both of (GB)

(73) Assignee: Fieldcroft Management Limited, London (GB)

( * ) Notice: Subject to any disclaimer, the term of this patent is extended or adjusted under 35 U.S.C. 154(b) by 0 days.

(21) Appl. No.: 09/324,215

(22) Filed: Jun. 2, 1999

(30) Foreign Application Priority Data

Dec. 11, 1998 (GB) ................................................ 9824704

(51) Int. Cl.[7] .................................................... B64D 25/04
(52) U.S. Cl. .................. 244/122 R; 297/228.13; 297/219.1; 297/283.2; 297/218.1; 297/218.3
(58) Field of Search ................... 244/122 R; 297/219.1, 297/225, 228.13, 229, 283.1, 283.2, 218.1, 218.2, 218.3

(56) References Cited

U.S. PATENT DOCUMENTS

| | | |
|---|---|---|
| 2,798,524 * | 7/1957 | Ryon ....................................... 150/28 |
| 3,199,916 | 8/1965 | Chiarenza ............................. 297/223 |
| 4,019,776 | 4/1977 | Takamatsu ............................ 297/219 |
| 4,103,968 * | 8/1978 | Butterfield et al. .................. 297/219 |
| 4,627,587 * | 12/1986 | McCutchan et al. ............ 244/122 R |
| 4,887,865 | 12/1989 | Dawidzon ............................. 297/382 |
| 5,007,676 | 4/1991 | Lien ..................................... 297/218 |

FOREIGN PATENT DOCUMENTS

| | | |
|---|---|---|
| 0 401 982 | 12/1990 | (EP) . |
| 2 447 166 | 8/1980 | (FR) . |
| 1160398 | 8/1969 | (GB) . |

* cited by examiner

Primary Examiner—J. Woodrow Eldred
(74) Attorney, Agent, or Firm—Lee, Mann, Smith, McWilliams, Sweeney & Ohlson (57) ABSTRACT

An aircraft seat has a frame assembly onto which is attached a shaped front cover by means of clips, each having a socket component and a plug component. The plug and socket components are repeatedly engageable and disengageable, enabling the front cover to be repeatedly removed from and refitted to the frame assembly, for example for cleaning of the front cover. The clips ensure accurate and precise fitting and location of the seat cover with respect to the frame assembly.

17 Claims, 11 Drawing Sheets

AIRCRAFT SEATS

This invention relates to aircraft seats.

Aircraft seats normally have fabric covers (which may be upholstered) which are removable from the seat frames at regular intervals for cleaning. This requirement alone marks out aircraft seats as different from other vehicle seats, such as car or bus seats, where the fabric covering is fixed to the seat frame and any cleaning of the fabric covering is normally done in situ.

The fabric panels of aircraft seats are generally attached to the seat frames by hook and loop fastenings of the form known as "Velcro". These are quick and easy to fasten and separate but suffer from the disadvantage that if the co-operating Velcro parts are initially placed together out of the required positioning or alignment, the engaged parts cannot then be slid one relatively to another to achieve the correct positioning.

A modern aircraft typically has a few hundred seats. After a period of use the fabric covers are removed for cleaning. Cleaned covers are then attached by an operative who will aim to fit the large number of cleaned covers in the minimum time. The result is that many covers are not properly fitted and correction frequently requires the entire cover to be removed and carefully refitted in the correct position. In one aspect, the invention tackles this problem by providing a means enabling more accurate attachment and location of fabric covers onto aircraft seats. In another aspect, the invention provides an improved front cover for fitting to an aircraft seat assembly.

According to one aspect the invention provides a seat for an aircraft, the seat comprising a seat frame assembly with a back portion and seat portion, and a cover for attachment to the seat frame assembly in order to cover a front surface of the back portion and/or an upper surface of the seat portion, the cover being detachably securable on the seat frame assembly by a plurality of clips having manually engageable and disengageable formations positioned to retain and locate the cover accurately with respect to the seat frame assembly.

Each clip preferably comprises a socket component and a plug component, and in a preferred embodiment the plug component has a rotatable toggle movable between a locking position in which the plug is locked in the socket and a release position in which the plug can be inserted in or removed from the socket.

The cover preferably has a back portion and a seat portion which adjoin along a curved line, such that the seat portion and back portion are capable of being folded together to lie substantially flat against one another, when the cover is detached from the seat frame assembly.

A front edge of the seat panel is preferably attachable by said clips to an underside front edge of the seat portion of the seat frame assembly. An upper edge of the back panel may be attached by further clips to the headrest region of the seat frame assembly, or alternatively this attachment may be achieved by forming the upper region of the cover into a hood which fits closely over the upper end of the seat frame assembly. In either case, it is desirable to attach the transitional region of the base panel and the seat panel to the seat frame assembly, and this is conveniently achieved by a two-component plastics clasp, one component being attached to the seat frame assembly and the other to the cover in the region of the curved line.

A semi-rigid back panel may be provided to cover the rear of the back portion of the seat frame assembly, and this back panel is conveniently of a composite construction having a foam layer covered by a fabric. The back panel is preferably attachable to the seat frame assembly by fasteners which afford repeated attachment to and removal from the seat frame assembly, and these fasteners may be the same as or different from the clips used to attach the cover to the seat frame assembly.

The seat frame assembly preferably comprises a rigid seat frame to which is attached a foam cushion, preferably by clips similar to the clips used to attach the cover to the seat frame assembly.

According to another aspect of the invention a front cover for fitting to an aircraft seat frame assembly comprises a seat portion and a back portion each formed by moulding to a three-dimensional shape conforming to the shape presented by the seat frame assembly, so that the front cover is a neat and accurate fit on the seat frame assembly, the cover comprising a seat portion and a back portion each formed by moulding to a three-dimensional shape conforming to the shape presented by the seat frame assembly, so that the front cover is a neat and accurate fit on the seat frame assembly, the front cover having formulations for cooperation with complementary formations on the seat frame assembly, allowing for repeated attachment and removal of the cover with respect to the assembly.

The seat portion and the back portion of the front cover may be joined together along a line which is concave when the front cover is viewed from the front, and the portions may be joined along this line by stitching.

Each portion of the front cover may be of composite construction, having an intermediate layer of foam sandwiched between a backing scrim and a decorative top layer of fabric on the surface of the cover which is visible in use.

Two embodiments of the invention (together with modifications) will now be described, by way of example, with reference to the accompanying drawings, in which.

Figure 5:
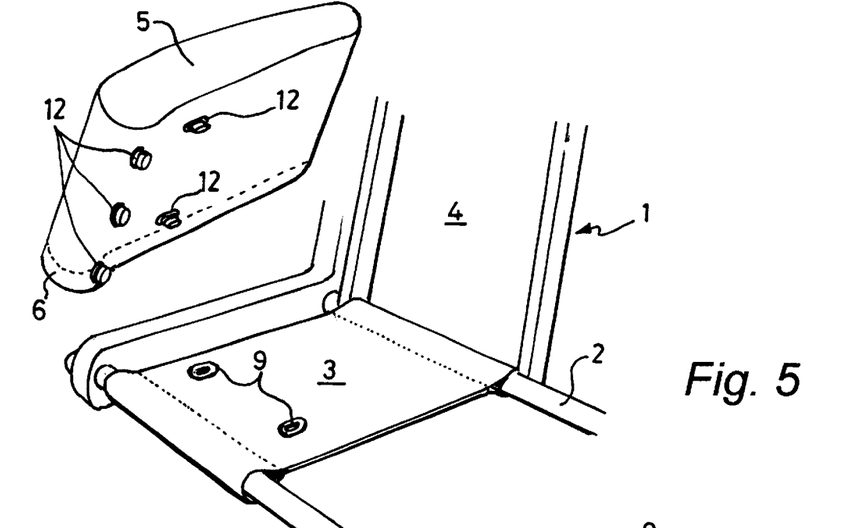
FIG. 5 is a fragmentary view illustrating the attachment of a foam cushion to a frame of the seat.

The aircraft seat forming the first embodiment of the invention has a rigid frame 1 (FIG. 5) made from tubular alloy 2 and panels made from alloy or a plastics composite material known as DYMETROL. The frame 1 defines a seat portion 3 and a back portion 4, as best illustrated in FIG. 5. A foam cushion 5 is attached to the rigid frame to form a seat frame assembly. The outer edge of the foam cushion 5 is covered by fabric 6. The seat and back portions 3 and 4 of this frame assembly are covered by a front cover 7, and a semi-rigid back panel 8 covers the rear surface of the back of the frame assembly.

Figures 6, 7:
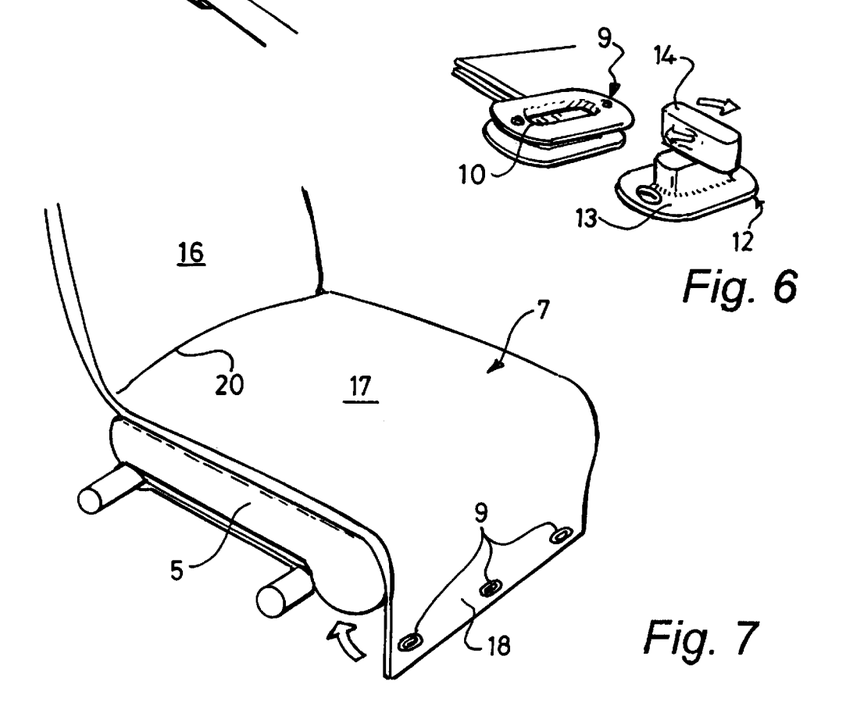
FIG. 6 illustrates two components of a plastics clip.
FIG. 7 illustrates the attachment of the front cover to the seat frame assembly.

The two-component plastics clip shown in FIG. 6 is used in several places in the seat. This clip is similar to that used in conventional luggage retention systems. One component 9 of the clip is in the shape of a socket having an elongated loop defining a central aperture 10. The other component 12 of the clip is in the form of a plug and has a base 13 on which is pivotally mounted a toggle 14 which can be turned between a locking position (illustrated) and a release position, displaced by 90° from the locking position. When in the release position, the toggle 14 can be inserted into the aperture 10 and locked in position by rotating the toggle 14 through 90° to its locking position. Release from the locking position is effected by rotating the toggle 14 through 90° to its release position, enabling the two components 9 and 12 of the clip to be separated.

In order to attach the foam cushion 5 to the seat portion 3, two clips of the form shown in FIG. 6 are used. The sockets 9 of the clips are attached to the seat portion 3 in the positions illustrated in FIG. 5, and the plug components 12 of the clips are attached to the underside of the foam cushion 5, so that placement of the foam cushion 5 on the seat portion 3 causes the toggles 14 to pass through the apertures 10, enabling the toggles 14 to be rotated to their locking positions. The foam cushion 5 is thereby attached to the frame in the required position from which it cannot be removed or displaced, except by releasing the clips.

Figure 3:
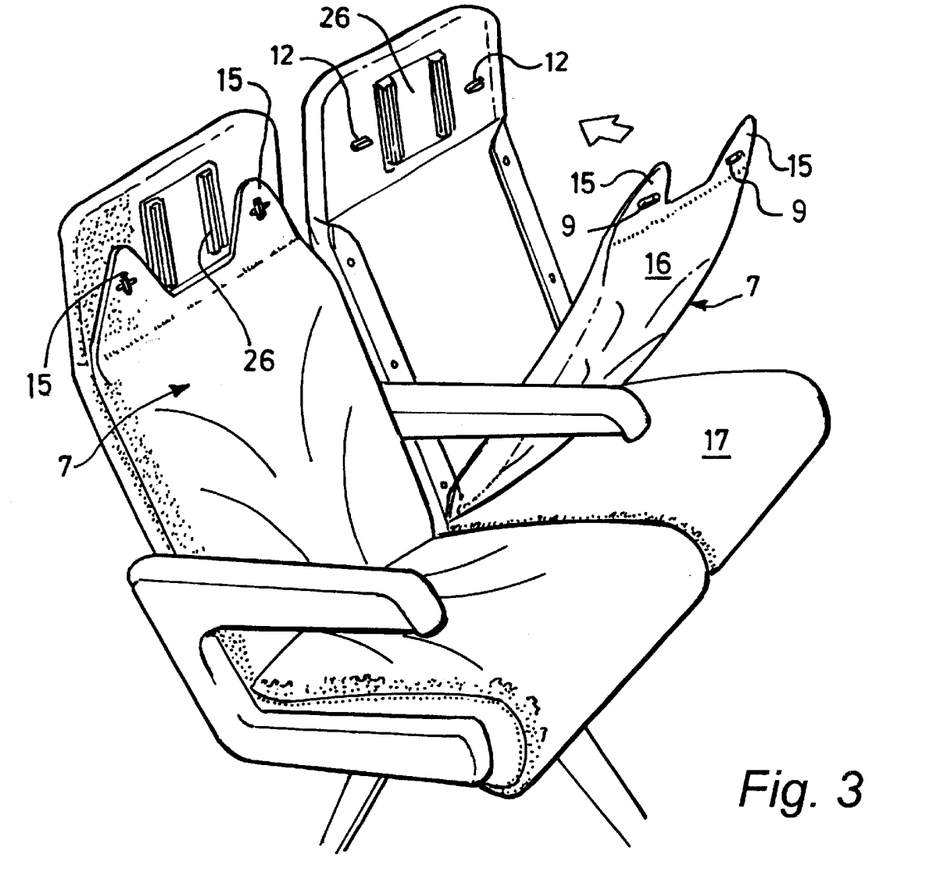
FIG. 3 is a view similar to that of FIG. 1 but with removable headrests removed and the front cover partially removed.

Similar clips are used to attach the front cover 7 to the seat frame assembly. At the top of its back portion 16, the front cover has two upwardly projecting ears 15 (FIG. 3), each carrying a clip socket 9. The area of the frame covered by the headrests carries two clip plugs 12 which co-operate with the two sockets 9 to provide detachable connection and accurate location of the upper part of the front cover 7 with respect to the frame assembly.

The seat portion 17 of the front cover 7 is made of sufficient length to form, at its front edge 18, (FIG. 7) a flap which is folded over the front edge of the foam cushion 5, the edge of this flap 18 carrying three clip sockets 9 respectively engageable with three clip plugs 12 on the front underside of the foam cushion 5, these three clip plugs being best shown in FIG. 5.

Figure 4:
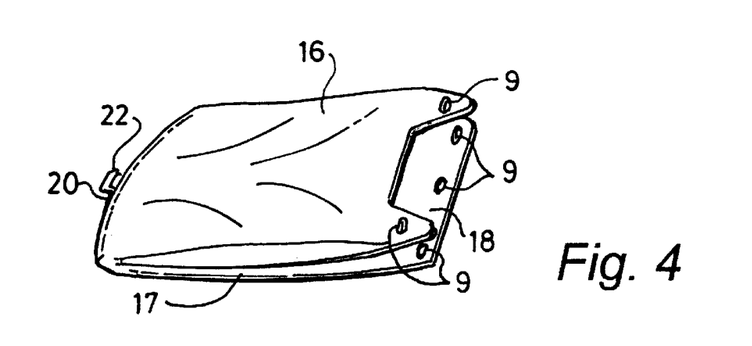
FIG. 4 shows the front cover removed from the seat and in a folded condition.

The transition between the seat and back portions 17, 16 of the front cover 7 is formed by a curved line of stitching 20 which is concave (when the cover is viewed from the front) so that the front cover 7 fits neatly in position on the frame assembly. The curved shape of this line 20 also means that the front cover 7 can be folded about this curved line 20 to occupy a compact folded condition, as illustrated in FIG. 4.

Figures 11, 12:
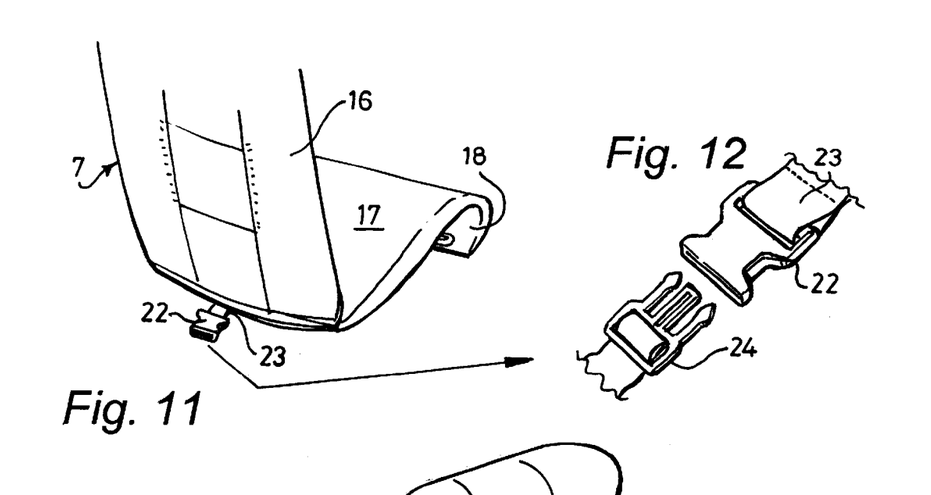
FIG. 11 illustrates the front cover unfolded and ready to be fitted to the seat frame assembly.
FIG. 12 illustrates a two-part clasp for attaching the front cover to the seat frame assembly.
Figure 13:
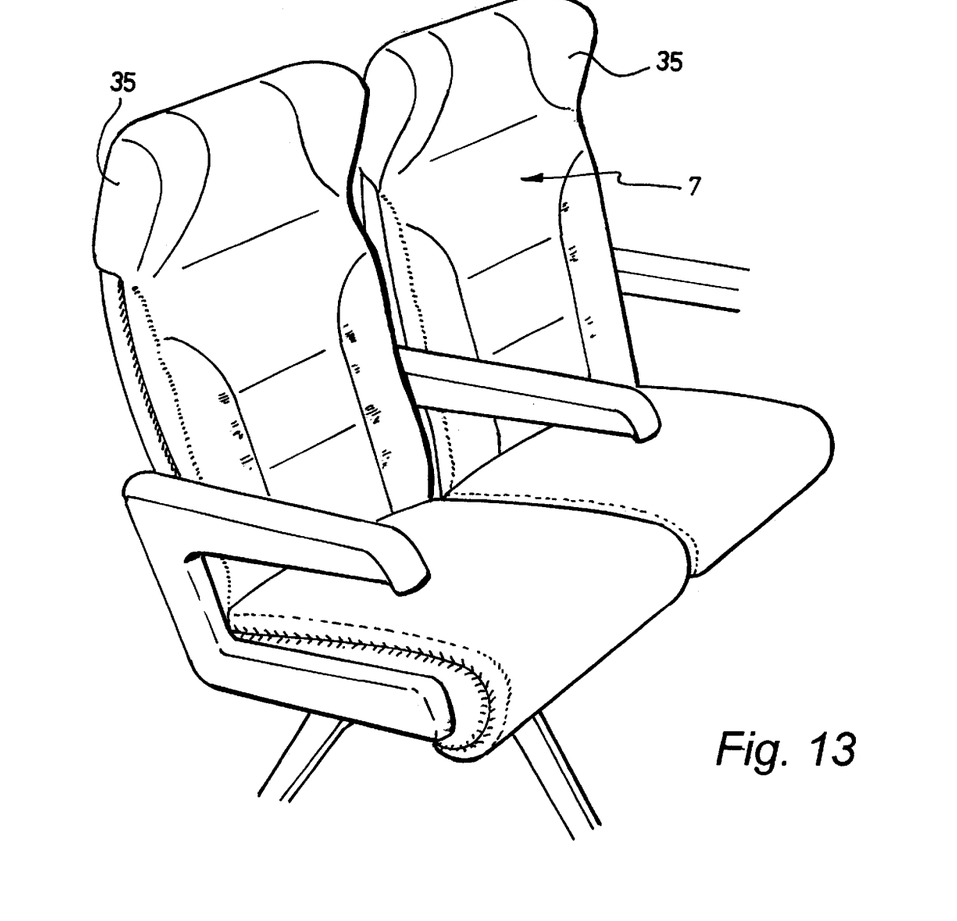
FIG. 13 is a front perspective view showing a pair of seats each forming the second embodiment of the invention.
Figure 14:
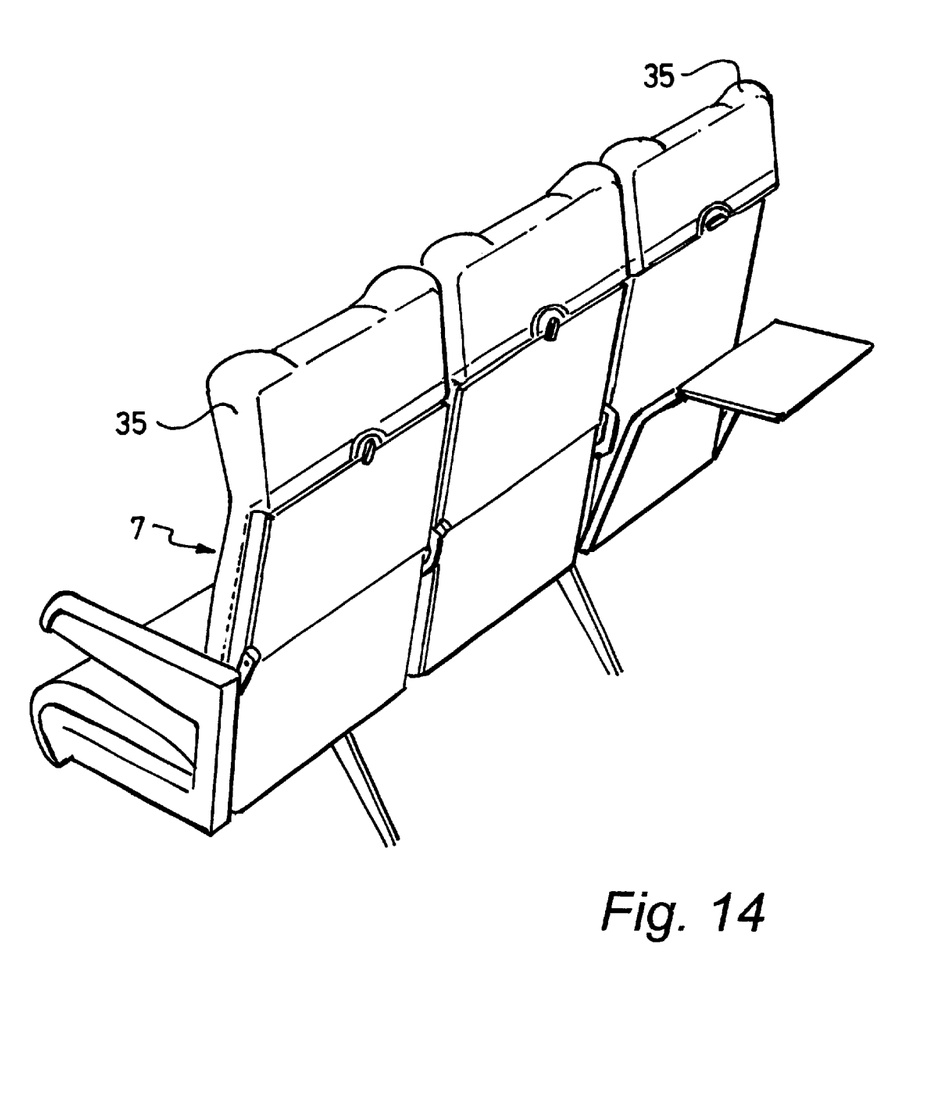
FIG. 14 is a perspective view, from the rear, of a group of three seats of the form shown in FIG. 13.
Figure 15:
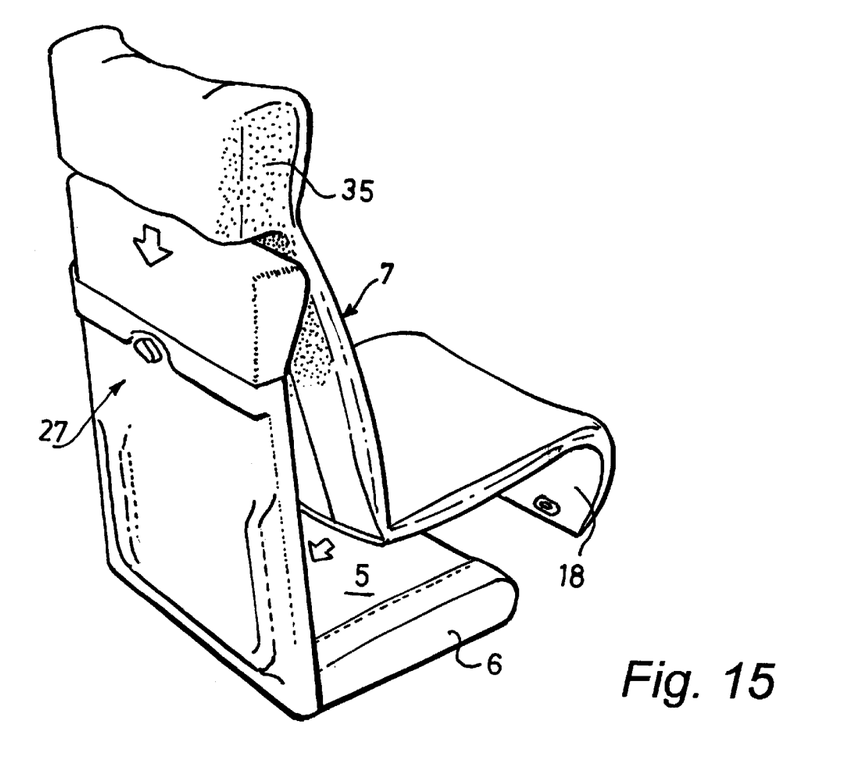
FIG. 15 is a perspective view showing the attachment of a front cover a seat frame assembly of the second embodiment of seat.

It is desirable to attach the area of the curved line 20 to the seat frame, and this is achieved by a plastics clasp (FIG. 12) having a socket portion 22 attached to the front cover by a short length of webbing 23, at or adjacent the curved line 20, and a plug portion 24 attached to the seat frame by a short length of webbing.

Upholstered headrests 25 conceal the clips used to attach the ears 15 of the front cover 7. As a consequence, all the attachments of the front cover 7 to the seat frame assembly are hidden from normal view. The headrest mountings, which provide vertical adjustment for the headrests 25, are shown at 26 in FIG. 3.

Figure 1:
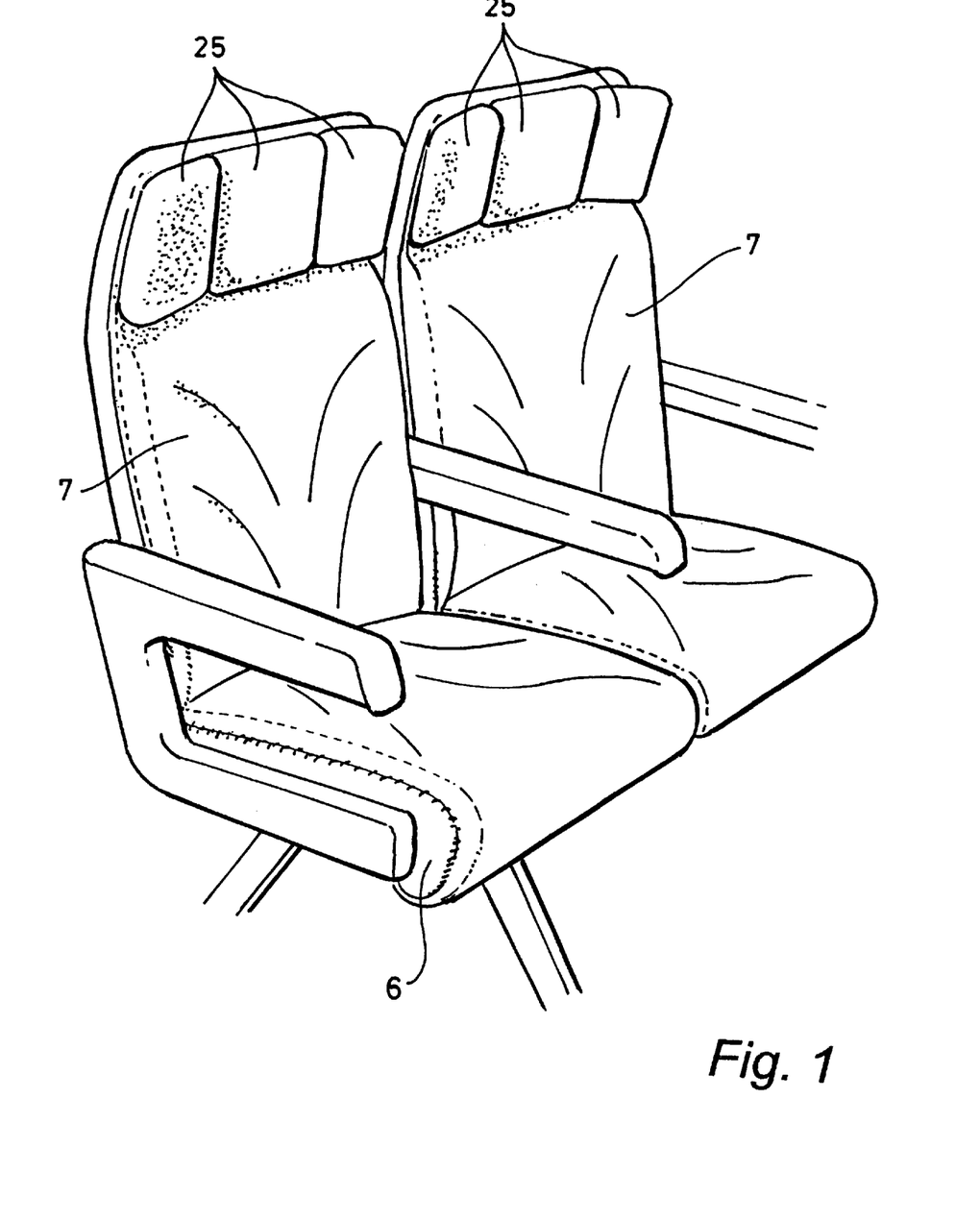
FIG. 1 is a perspective view, from the front, of a pair of aircraft seats each forming the first embodiment of the invention.
Figure 2:
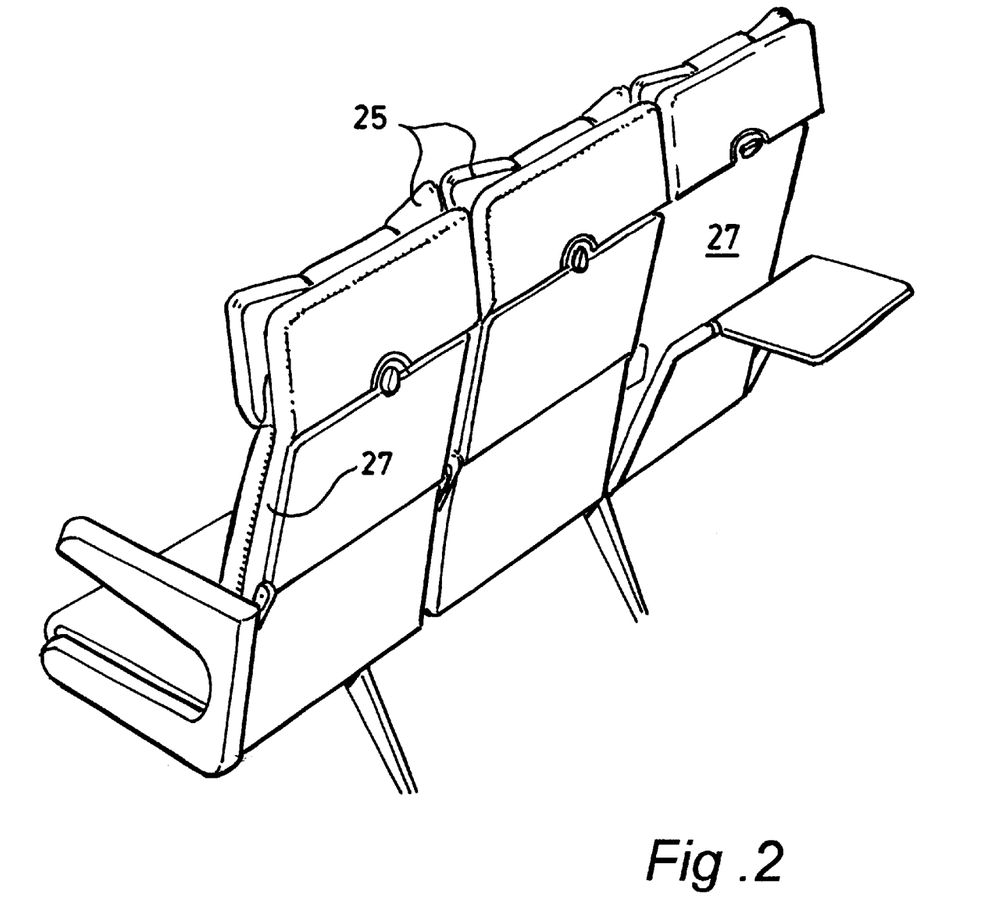
FIG. 2 is a perspective view, from the rear, of three aircraft seats of the form shown in FIG. 1.

The rear surface of the frame assembly is covered by a semi-rigid back panel 27 (FIGS. 2 and 8) which is moulded to the required shape and has a composite construction employing a layer of semi-rigid foam which is in turn covered by a fabric layer. This composite material is similar to that used for roof linings for cars.

Figures 8, 9, 10:
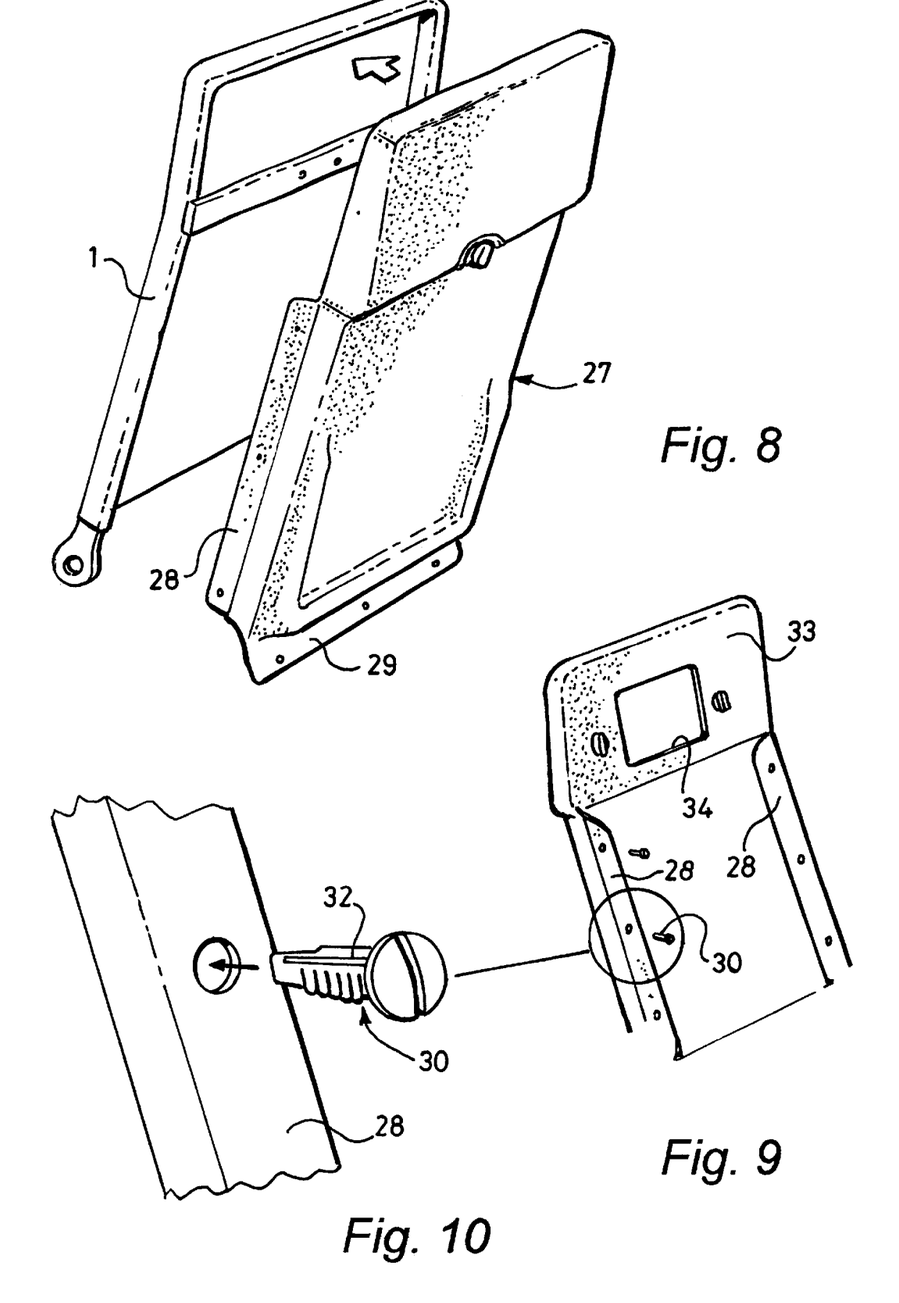
FIGS. 8 to 10 illustrate the attachment of a semi-rigid back panel to the seat frame assembly.

Referring to FIG. 8, the semi-rigid back panel 27 has edge flanges with holes for attaching the back panel 27 to the seat frame, these edge flanges being two side flanges 28 and a lower edge flange 29. The side flanges 28 are folded around the side members of the frame and are attached to the frame, from the front, by fasteners 30 of the type illustrated in FIG. 10. Each fastener 30 has a serrated shank 32 and a head with a cross slot for ease of turning, the fastener 30 being turned through 90° to release or fasten it in position. The lower edge flange 29 is attached to a horizontal member of the frame by similar fasteners.

As shown in FIG. 9, a fabric panel 33 is stitched or adhered to the front of the upper region of the back panel 27. A rectangular aperture 34 in the panel 33 accommodates the headrest mounting 26.

FIGS. 13 to 19 illustrate a second embodiment of seat which differs from the first embodiment principally in that the front cover 7 has an integrally formed hood 35 which fits over an upper upholstered region of the frame, in place of the separate headrests of FIGS. 1 to 12. In FIGS. 13 to 19 similar parts to those of FIGS. 1 to 12 bear the same reference numerals.

Figure 16:
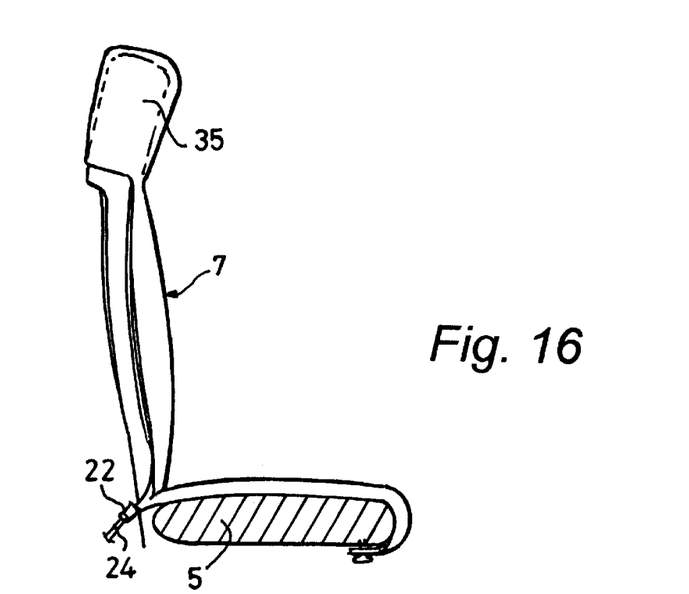
FIG. 16 is a sectional view through the second embodiment of seat.

In common with the seat of FIGS. 1 to 12, the seat of FIGS. 13 to 19 has a foam cushion 5 attached to the seat frame by plastics clips of the form shown in FIG. 6, and a front cover 7 attached to the underside of the cushion 5 by clips and to the frame by a clasp. However, the upper part of the front cover 7 is located in position by the hood 35 which is in the shape of an inverted pocket and which fits neatly over the headrest region of the seat, as shown in FIG. 16.

Figures 17, 18:
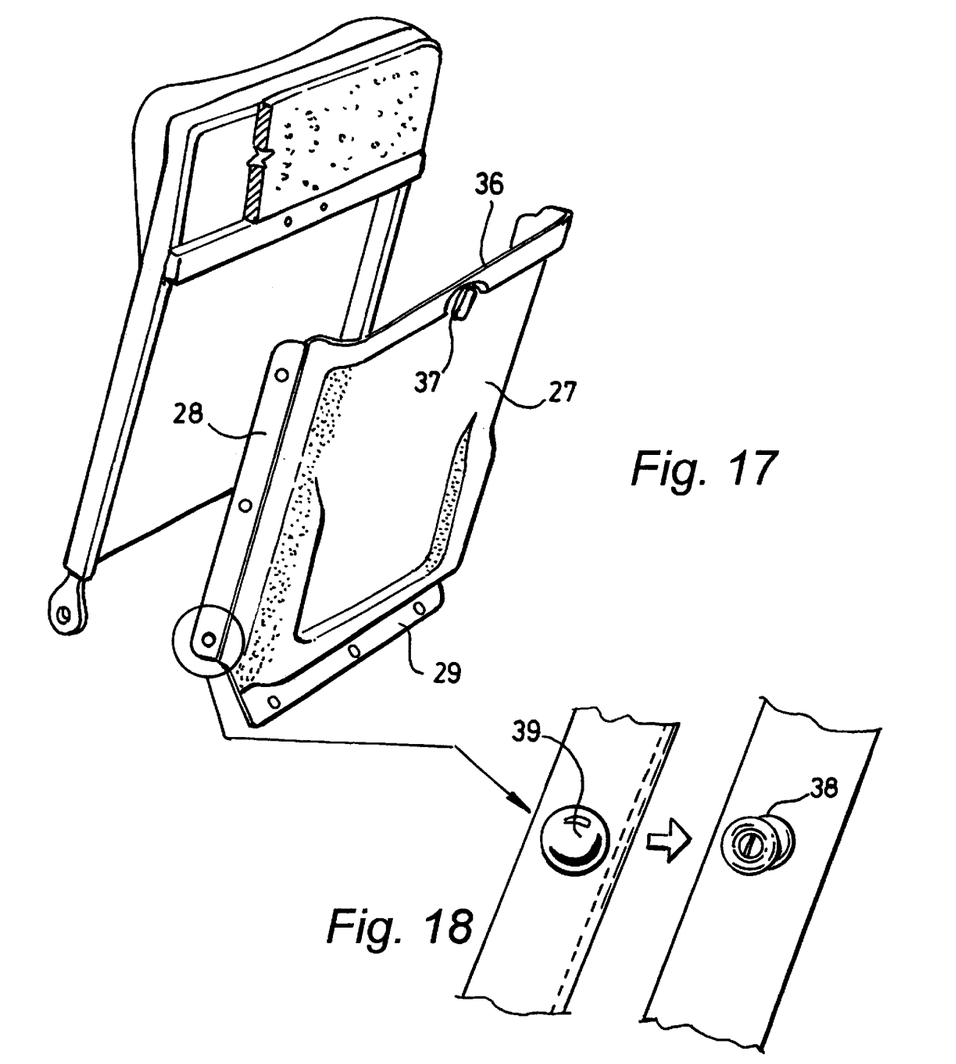
FIG. 17 shows the attachment of a semi-rigid back panel to the seat frame assembly of the seat of FIGS. 13 to 16.
FIG. 18 is a detail view illustrating press stud fasteners used in the attachment of FIG. 17.

The back panel 27 of the embodiment of FIGS. 13 to 19 does not cover the rear of the backrest region, but terminates in an upper edge 36 (FIG. 17) adjacent to which is a retaining clip 37 for holding the usual hinge-down tray. The flanges 28, 29 of the back panel 27 are detachably secured to the frame by press-studs having interengageable parts 38, 39, (FIG. 18). It will be appreciated that the fasteners of FIG. 10 could be used in FIG. 18 or vice versa.

Figure 19:
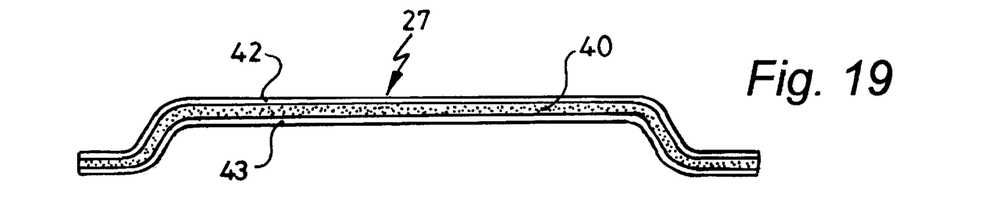
FIG. 19 is a fragmentary sectional view through the semi-rigid back panel of FIG. 8 or FIG. 17.

The back panel 27 of either embodiment is shown in section in FIG. 19. The panel 27 is of composite construction, having a semi-rigid foam layer 40 sandwiched between a fabric, leather or leatherette skin 42 and a backing scrim 43. The panel 27 is formed in a mould to have the required shape to accommodate a leaflet pocket and receive a hinged tray.

The front cover 7 is moulded using a double impression tool with the application of heat, pressure and adhesive to provide the finished cover 7 with a three-dimensional shape conforming exactly to the complex three-dimensional shape presented by the seat frame assembly to which the cover 7 is to be fitted. This is particularly important where the seat frame assembly presents a concave shape where known covers tend to bridge the space or to require Velcro attachments. By moulding the front cover 7 with a rear surface shape which conforms to the surface shape presented by the seat frame assembly, the front cover 7 is an accurate and neat fit on the seat frame assembly.

To achieve the required three-dimensional shape of the front cover 7 (whether this has a hood or not), the cover 7 is formed from a sandwich composite of backing scrim, flexible foam (which in practice is exfoliated graphite polyurethane foam) and front covering fabric, similar to the construction of the panel 27 shown in FIG. 19.

In each embodiment of seat, the front cover 7 can be rapidly removed from the seat frame assembly by disengagement of the plastic clips and clasp. Removed covers 7 may be neatly folded and stacked in a compact condition for transport to the location where they are cleaned. Cleaned covers 7, similarly neatly folded and stacked, can then be fitted to the seat frame assemblies in a quick and accurate fashion, the accurate and positive interengagement of the clips and clasp ensuring firm retention and very accurate location of the front covers 7 with respect to the seat frame assemblies. The three-dimensional shaping of the covers to conform to the shape presented by the seat frame assemblies helps neat location and accurate fit. The front covers 7 are thus replaceable quickly and accurately by unskilled labour, in comparison with known systems which take longer, can easily be fitted incorrectly because of the reliance on Velcro and require a degree of acquired skill to achieve acceptable results. Moreover, the clips allow repeated attachment and removal of the covers with respect to the seat frame.

Figure 20:
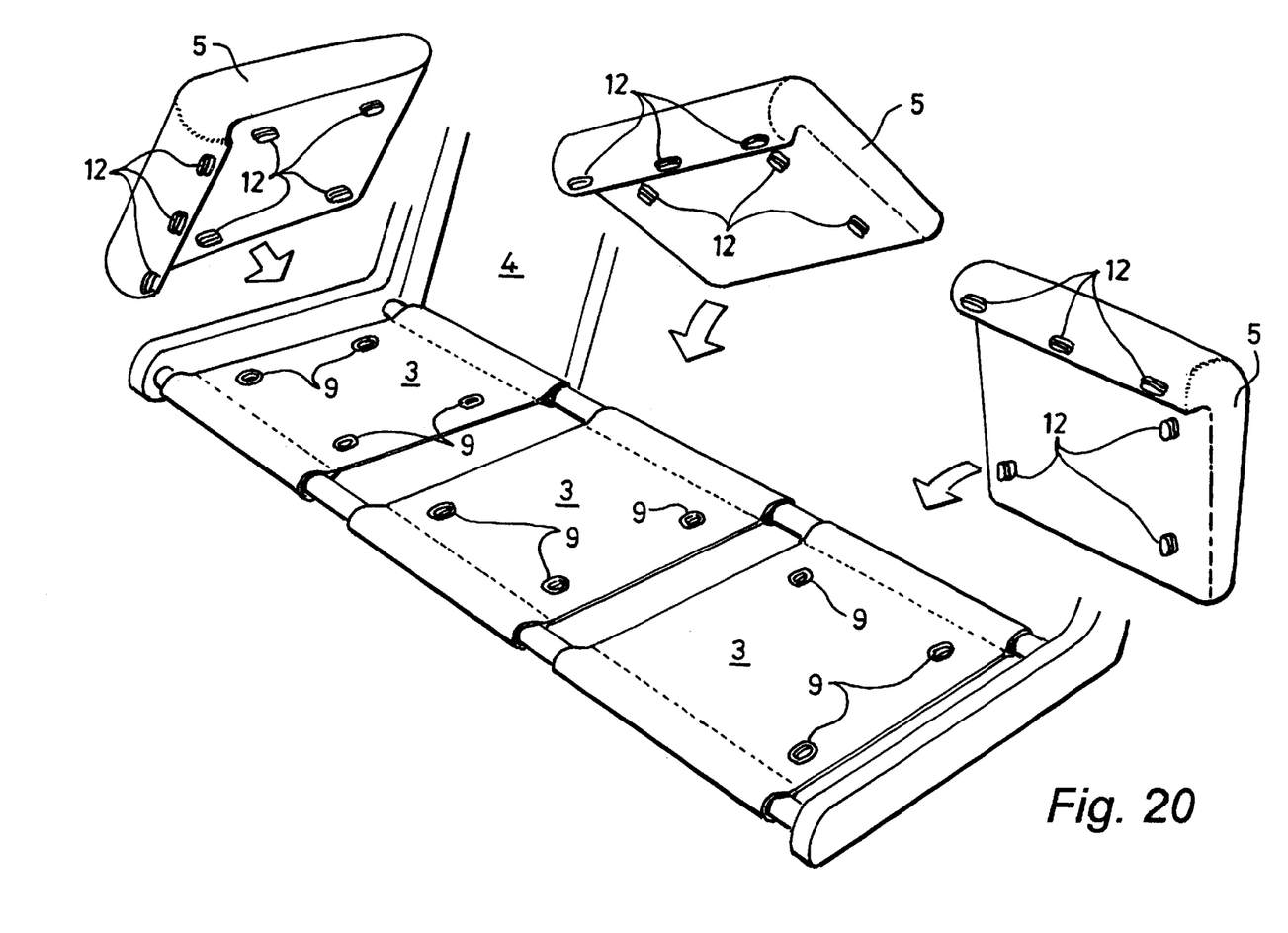
FIG. 20 illustrates modifications to the foam cushion attachment illustrated in FIG. 5.
Figure 21:
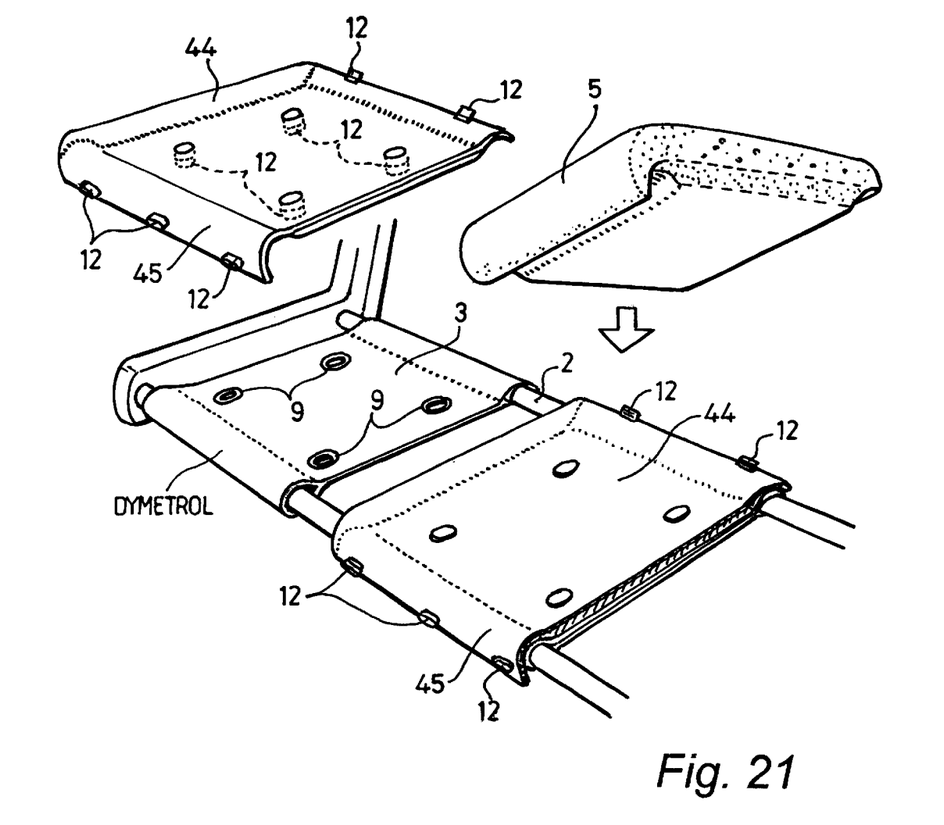
FIG. 21 illustrates a further modification to the arrangement of FIG. 5.
Figure 22:
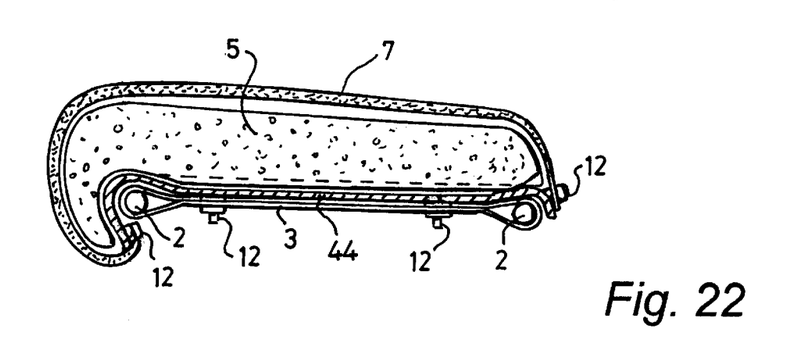
FIG. 22 is a sectional view through the assembled seat portion of the seat of FIG. 21.

In the modifications of FIGS. 20 to 22, corresponding parts bear the same reference numerals as used in the preceding figures. In FIG. 20, the seat portions 3 have socket components 9 at positions defining a particular pattern, so that a seat portion 3 is capable of accepting only cushions 5 with a matching or registering pattern of plug components 12 on the cushion undersides. This pattern will normally consist of at least three socket components 9 on each seat portion 3 and at least three registering plug components 12 on the underside of a cushion 5, the pattern being capable of being defined by different positions and different spacings of the components 9 and the components 12 to provide any desired number of different patterns and resulting number of different acceptable combinations of cushions 5 and seat portions 3.

FIG. 20 illustrates three different patterns, one consisting of four locations and two of three locations. In each case, the cushion 5 has a rounded front edge bearing three plug components 12 for retaining the front edge of a cover, in a manner comparable to that illustrated in FIG. 7. By providing the seat portions 3 and the undersides of the cushions 5 with particular patterns of cooperating plug components 12 and socket components 9, the cushions 5 are capable of being fitted only to particular seat portions 3, ensuring that particular aircraft seats (eg aisle, window or centre seat in a bank of three) can only receive the correct cushions 5, an important matter if the cushions differ in shape, size, fabric covering or other property. The remainder of each seat illustrated in FIG. 20 corresponds to the first embodiment illustrated in FIGS. 1 to 12, or FIG. 20 could alternatively be regarded as a modification to the second embodiment illustrated in FIGS. 13 to 19.

Referring to FIGS. 21 and 22, the seat is modified by the incorporation of a seat pan 44 which is preferably moulded to the required shape and may consist of a sandwich-like structure similar to the semi-rigid back panel 27. The seat pan 44 has a central recessed area surrounded by edge flanges, at least the front edge flange 45 being moulded with a rounded shape in order closely to embrace the front edge of the seat portion 3.

The underside of the seat pan bears four plug components 12 which respectively engage with four socket components 9 in the seat portion 3, in order to provide positive and reliable (but detachable) connection of the seat pan 44 to the seat portion 3. The cushion 5 is moulded to a shape which is complementary to the upper surface shape of the seat pan 44, affording a degree of location for the cushion 5 with respect of the seat pan and thus to the seat portion 3.

The front edge flange 45 of the seat pan 44 has three plug components 12 to locate the front edge of the fabric cover 7, in the manner illustrated in FIG. 22. A further pair of plug components 12 are located on the rear edge flange of the seat pan 44, these being engageable with a pair of socket components formed in the cover 7 at the line 20. It will be appreciated that these plug and socket components are provided instead of the clasp of FIG. 12.

When fitted, the cover 7 overwraps the cushion 5 and holds the latter in position in the recess in the seat pan 44. No plug or socket components are necessary on the cushion so that if the latter needs replacement no plug or socket components are lost.

What is claimed is:

1. A seat for an aircraft, the seat comprising a seat frame assembly and a front cover for attachment to the seat frame assembly, the cover being detachably securable on the seat frame assembly by a plurality of clips having manually engageable and disengageable pairs of formations with one formation of each pair being on the seat frame assembly and the other formation of the pair being on the cover and being uniquely associated with said one formation, whereby the clips are operative to detachably retain and accurately locate the cover with respect the seat frame assembly, wherein each clip comprises a plug component and a socket component with a socket and the clip is capable of occupying a locking position in which the plug component is locked in the socket and cannot be released therefrom and a release position in which the plug component can be inserted in or removed from the socket.

2. A seat according to claim 1, wherein the plug component has a rotatable toggle which, in the locking position of the clip, cannot be withdrawn from the socket and which, in the release position of the clip, can be inserted in or removed from the socket.

3. A seat according to claim 1, wherein the plug components are mounted on the seat frame assembly and the socket components are attached to the front cover.

4. A seat according to claim 1, wherein the front cover comprises a seat portion and a back portion each formed by moulding to a three-dimensional shape conforming to the shape presented by the seat frame assembly, so that the front cover is a neat and accurate fit on the seat frame assembly.

5. A seat according to claim 4, wherein the back portion and the seat portion join along a curved line about which the back portion and seat portion are foldable together to lie substantially flat against one another when the cover is removed from the seat assembly.

6. A seat according to claim 4, wherein a front edge of the seat portion is attachable by said clips to an underside front edge of the seat frame assembly.

7. A seat according to claim 4, wherein an upper edge of the back portion is attachable by said clips to a headrest region of the seat frame assembly.

8. A seat according to claim 4, wherein an upper region of the back portion has a hood which fits closely over an upper end of the seat frame assembly.

9. A seat according to claim 5, wherein the region of the curved line is detachably connected to the seat frame assembly by said clips or by a plastics clasp.

10. A seat according to claim 1, wherein the seat frame assembly comprises a rigid seat frame on which bears a foam cushion which is covered by said cover, wherein the cushion is detachably connected to the seat frame by further clips having plug formations respectively engageable with socket formations.

11. A plurality of seats wherein each seat comprises a seat frame assembly and a front cover for attachment to the seat frame assembly by a plurality of clips having manually engageable and disengageable pairs of formations with one formation of each pair being on the seat frame assembly and the other formation of the pair being on the cover and being uniquely associated with said one formation, whereby the clips are operative to detachably retain and accurately locate the cover with respect to the seat frame assembly, wherein each seat frame assembly comprises a rigid seat frame on which bears a corresponding foam cushion which is covered by said cover, wherein the cushion is detachably connected to the seat frame by further clips having plug formations respectively engageable with socket formations, and wherein the plug and socket formation of the further clips are positioned in a pattern which differs from seat to seat, ensuring that only a cushion with a matching pattern can be fitted to a particular seat frame.

12. A seat according to claim 1, wherein the seat frame assembly comprises a seat frame, a seat pan detachably connected by further said clips to the seat frame and a cushion which is supported on the pan and which is covered by the cover, clip formations on the cover being engageable with cooperating clip formations on the seat pan.

13. A seat according to claim 1, wherein a semi-rigid back panel covers a rear of a back portion of the seat frame assembly, the semi-rigid back panel being detachably connected to the seat frame assembly.

14. A front cover means for fitting to an aircraft seat frame assembly, the cover means comprising a seat portion and a back portion each formed by molding to a three-dimensional shape conforming to the shape presented by the seat frame assembly, so that the front cover means is a neat and accurate fit on the seat frame assembly, the front cover means having formations for cooperation with complementary formations in the seat frame assembly, allowing for repeated attachment and removal of the cover means with respect to the assembly, and wherein each portion of the cover means is of composite construction, having an intermediate layer of foam sandwiched between a backing scrim and a decorative top layer of fabric on the surface of the cover means which is visible in use.

15. A front cover means according to claim 14, wherein the seat portion and the back portion of the front cover means are joined along a curved line which is concave when the front cover is viewed from the front, the portions of the front cover means being foldable together about the curved line to occupy a compact folded condition.

16. A plurality of seats according to claim 11, wherein each of said further clips is capable of occupying a locking position in which the plug formation is locked in the socket formation and cannot be released therefrom and a release position in which the plug formation can be inserted in or removed from the socket formation.

17. A plurality of seats according to claim 16, wherein each plug formation has a rotatable toggle which, in the locking position of the clip, cannot be withdrawn from the socket formation and which, in the release position of the clip, can be inserted in or removed from the socket formation.

* * * * *